United States Patent [19]

Osborne

[11] Patent Number: 4,896,537
[45] Date of Patent: Jan. 30, 1990

[54] SHROUDED TURBINE BLADE VIBRATION MONITOR

[75] Inventor: Robert L. Osborne, Winter Springs, Fla.

[73] Assignee: Westinghouse Electric Corp., Pittsburgh, Pa.

[21] Appl. No.: 201,225

[22] Filed: Jun. 2, 1988

[51] Int. Cl.⁴ .......................................... G01H 11/00
[52] U.S. Cl. ...................................... 73/660; 324/207
[58] Field of Search .................. 73/654, 660; 324/207, 324/208

[56] References Cited

U.S. PATENT DOCUMENTS

| | | | |
|---|---|---|---|
| 3,924,140 | 12/1975 | Yannone | 340/521 |
| 4,144,421 | 3/1979 | Sakai | 200/61.4 |
| 4,326,804 | 4/1982 | Mossey | 356/375 |
| 4,384,819 | 5/1983 | Baker | 415/14 |
| 4,395,827 | 8/1983 | Stowe et al. | 33/181 R |
| 4,422,333 | 12/1983 | Leon | 73/660 |
| 4,573,358 | 3/1986 | Luongo | 73/660 |
| 4,593,566 | 6/1986 | Ellis | 73/660 |
| 4,644,270 | 2/1987 | Oates et al. | 324/207 |
| 4,790,189 | 12/1988 | Twerdochlib | 73/660 |

FOREIGN PATENT DOCUMENTS 0236827 11/1969 U.S.S.R. ............................... 73/660

OTHER PUBLICATIONS

Jones, Development of a Noninterference Technique for Measuring Turbine Engine Rotor Blade Stresses, AIAA 21st Joint Propulsion Conference, (1985).

Primary Examiner—Michael J. Tokar
Assistant Examiner—Lawrence Fess
Attorney, Agent, or Firm—B. R. Nath

[57] ABSTRACT

A shrouded turbine blade vibration monitoring system is comprised of a plurality of sensors for sensing a profile of a turbine blade row. A microprocessor compares the sensed profile to an expected profile of the turbine blade row to detect motion of the turbine blades due to vibration. The microprocessor then generates an operator alarm and trips the turbine in response to the detection of unacceptable vibration of the turbine blades.

20 Claims, 6 Drawing Sheets

SHROUDED TURBINE BLADE VIBRATION MONITOR

BACKGROUND OF THE INVENTION

Field of the Invention:

The present invention is directed generally to monitoring operating parameters in a steam turbine generator and, more specifically, to the monitoring of turbine blade vibration.

CROSS REFERENCE TO RELATED APPLICATION:

The present application is related to U.S. application Ser. No. 199633 entitled TURBINE BLADE SHROUD CLEARANCE MONITOR filed 5/27/88, which is assigned to the same assignee as the present invention (W.E. 54,160).

DESCRIPTION OF THE PRIOR ART:

Turbine blades, because of their complex design, can suffer from vibration at frequencies which correspond to natural frequencies of the blades called modes. Each mode is associated with a different type of vibration such as along the rotational axis of the turbine, perpendicular to the rotational axis of the turbine, etc. In order to prevent excessive vibration of the blade about its normal position, normal design practice dictates that the blades be constructed such that these modes are located between harmonics of the operating frequency of the steam turbine. However, manufacturing tolerances, changes in blade attachment to the rotor, changes in blade geometry due to erosion and changes in the operating frequency of the turbine, among other factors, cause mode frequencies to approach harmonics of the operating frequency. Additionally, damaging nonsynchronous vibration may also occur. Typically, nonsynchronous vibration in a steam turbine may occur as a result of buffeting wherein a low steam flow and a high back pressure cause the random excitation of the turbine blades or as a result of turbine rotor torsional stresses.

The approach of the modes to the harmonics of the operating frequency may result in physical damage to the steam turbine. When the amplitude of the vibration exceeds a certain level, objectionable stresses are set up in the blade. If the condition is not detected and remedied, the blade may eventually fracture resulting in an extremely costly forced outage of the machinery. Thus, a method for detecting this vibration is necessary in order to prevent such damage.

The prior art method for detecting shrouded blade vibration is to attach strain gages to the turbine blades. Sensor information is communicated to analyzing equipment outside the machine by means of miniature transmitters affixed to the machine's rotating shaft at various locations. A typical prior art shrouded turbine blade row 10, illustrated in FIG. 1, includes the following components: rotor disk 11, blades 12, shroud segments 13, tenons 14, seal 15 and strain gages 22. The tenons 14 are integral parts of the blades 12 that serve to fasten the shroud segments 13 to the blades 12. The seal 15 reduces the amount of steam that passes around instead of through the turbine blades 12. The strain gages 22 measure the vibration of the turbine blades 12 and transmit a signal representative of the level of vibration from the rotor disk 11 to stationary electronics (not shown).

Figure 1:
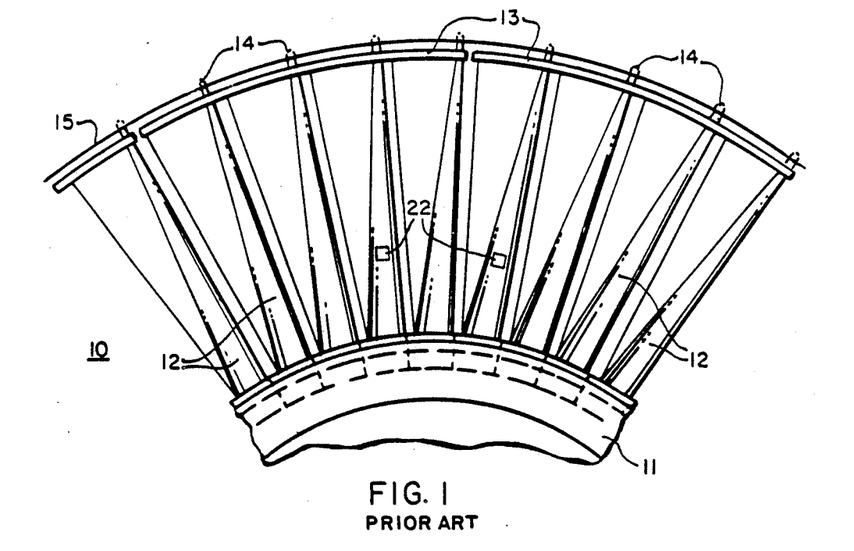
FIG. 1 illustrates a prior art shrouded turbine blade vibration monitoring system.

This prior art method suffers from three significant drawbacks. First, the strain gage 22 has a very short life due to erosion caused by steam passing through the turbine blades 12. Second, each blade 12 requires a strain gage 22 if all blades 12 in a row 10 are to be monitored. This represents a significant expense. Additionally, only a limited number of transmitters and, therefore, sensors can be accommodated inside the machine. Third, the complexity of continuously and reliably supplying power to the strain gage 22 and transmitting the signal reliably from the rotating rotor disk 11 to stationary electronics (not shown) creates severe difficulties.

To obviate these problems, apparatus exist for detecting turbine blade vibration which utilize permanently installed, non-contacting proximity sensors. One such apparatus is disclosed in U.S. Pat. No. 4,573,358 wherein a plurality of sensors spaced about the periphery of the blade row detect vibration of operator selected blades. This apparatus, however, because of the physical differences between shrouded and unshrouded turbine blades, is not easily adaptable to a shrouded turbine blade arrangement.

Thus, there is a need for a long-lived monitor that will measure shrouded blade vibration at a comparatively small expense. The present invention fills the need for such a shrouded turbine blade vibration monitoring system.

SUMMARY OF THE INVENTION

The present invention is directed to a shrouded turbine blade vibration monitoring system comprised of a plurality of sensors for capturing the profile of each of the turbine blade rows in a steam turbine by determining the presence of turbine blade shroud segments and turbine blade tenons. Means are provided for storing an expected profile of the turbine blade row and then comparing the sensed profile to the expected profile to detect motion of the turbine blades due to vibration. Output means then generate responses to this comparison.

According to one embodiment of the present invention, a microprocessor compares the time of arrival of each turbine blade tenon at the sensor to an expected time of arrival at the sensor. The microprocessor can, thus, detect motion of the turbine blade shroud segments both within the plane containing the turbine blade row and in a plane perpendicular to the plane containing the turbine blade row. The amplitude and frequency of the turbine blade motion may, thus, be determined.

The present invention is also directed to a method for monitoring the vibration of turbine blades by sensing a profile of the turbine blade row. This method includes the steps of generating an expected profile of the turbine blade row, comparing the sensed profile to the expected profile to detect motion of the turbine blades due to vibration and generating output responsive to this comparison.

The shrouded turbine blade vibration monitor of the present invention may be used in any steam turbine utilizing shrouded turbine blades. In a typical steam generator composed of rows of high pressure, intermediate pressure and low pressure blades, all rotating rows with the exception of the last row in the low pressure turbine have a shroud at their outer periphery. The need for such a system exists because of the importance of monitoring the level of turbine blade vibration. Excessive vibration may result in the destruction of steam turbine components. The shrouded turbine blade vibration monitoring system will alert an operator of a critical vibration level in addition to initiating turbine protective action. These and other advantages and benefits of the present invention will become apparent from the description of a preferred embodiment hereinbelow.

BRIEF DESCRIPTION OF THE DRAWINGS

In order that the present invention may be clearly understood and readily practiced, preferred embodiments will now be described, by way of example only, with reference to the accompanying figures wherein.

DETAILED DESCRIPTION OF THE PREFERRED EMBODIMENT

Figure 2:
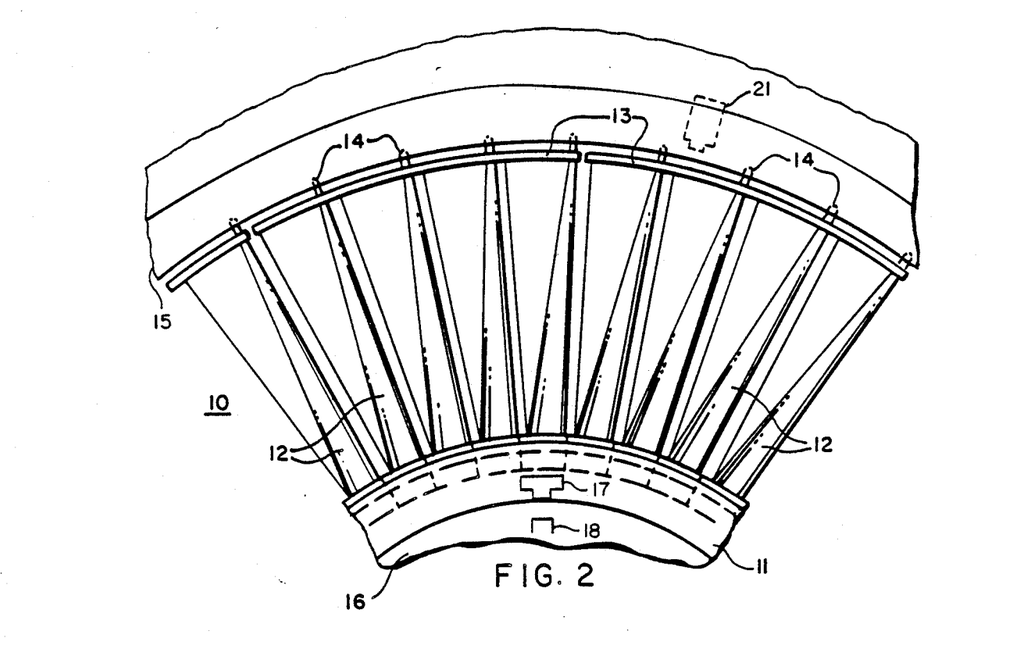
FIG. 2 illustrates a shrouded turbine blade row in conjunction with which the method and apparatus of the present invention may be used.

FIG. 2 illustrates a shrouded turbine blade row 10 in which the method and apparatus of the present invention to monitor turbine blade vibration can be employed. Like reference numerals are employed among the various figures to designate like elements. As previously illustrated in FIG. 1, the turbine blades 12 are connected to a rotor 16 by means of the rotor disk 11. The tenons 14 are integral parts of the blades 12 and serve to fasten the shroud segments 13 to the blades 12. The seal 15 reduces the amount of steam that passes around instead of through the turbine blades 12. Also illustrated in FIG. 2 is a sensor 21, which is the means for monitoring the vibration of the turbine blades 12. The sensor 21 may be a variable reluctance sensor or may incorporate any practical method of sensing the relative distance between the sensor 21 and the surface characteristics of the shroud segment 13 including, but not limited to, microwave or optical methods. One type of sensor which can withstand the rigors of the interior of the steam turbine is described in U.S. Pat. No. 4,644,270. As further illustrated in FIG. 2, a reference sensor 17 is additionally provided. The sensor 17 in conjunction with indicia 18 on the rotor 16 is operable to provide an output signal once per rotor 16 revolution. Such a reference signal is commonly known in the turbine art.

Figure 3:
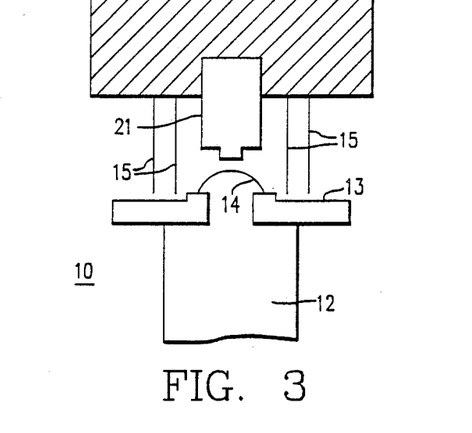
FIG. 3 illustrates a cross-sectional view of the turbine blade row arrangement of FIG. 2.
Figure 9:
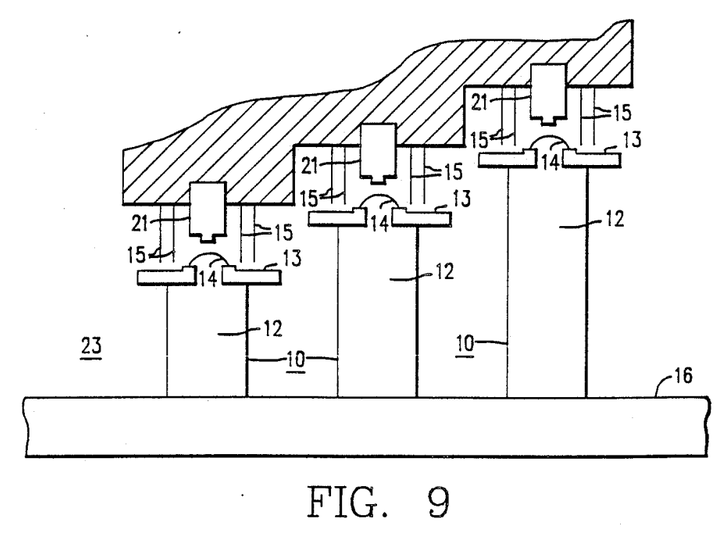
FIG. 9 illustrates a cross-sectional view of a steam turbine in conjunction with which the method and apparatus of the present invention may be used.

A cross-sectional view of a portion of the turbine blade row 10 arrangement of FIG. 2 is shown in FIG. 3. The sensor 21 is situated in the plane of the blade row 10, between the seals 15, and directly above the shroud segment 13 and tenon 14 surface. The placement of the sensor 21 outside of the direct flow path of the steam through the turbine blades 12 prevents significant erosion of the sensor 21. A typical steam turbine 23 shown in FIG. 9 consists of a plurality of turbine blade rows 10 consisting of blades 12 of differing sizes corresponding to the high pressure, intermediate pressure and low pressure stages of the steam turbine 23.

Figure 4:
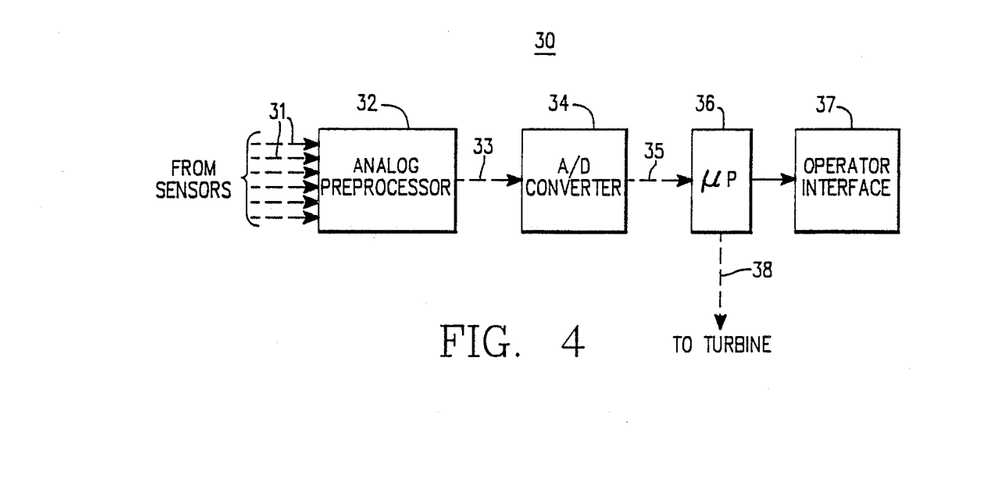
FIG. 4 illustrates a shrouded turbine blade vibration monitoring system constructed according to the teachings of the present invention.

The shrouded turbine blade vibration monitoring system 30 of the present invention is illustrated in FIG. 4. A sensor output signal 31 is provided as an input to an analog preprocessor 32. An analog output signal 33 of the analog preprocessor 32 is converted to a digital signal 35 by means of an analog-to-digital converter 34. The digital signal 35 is input to a microprocessor 36 which drives an operator interface 37 and provides a control signal 38 to trip the turbine generator (not shown) in response to the detection of excessive vibratory motion.

Figure 5:
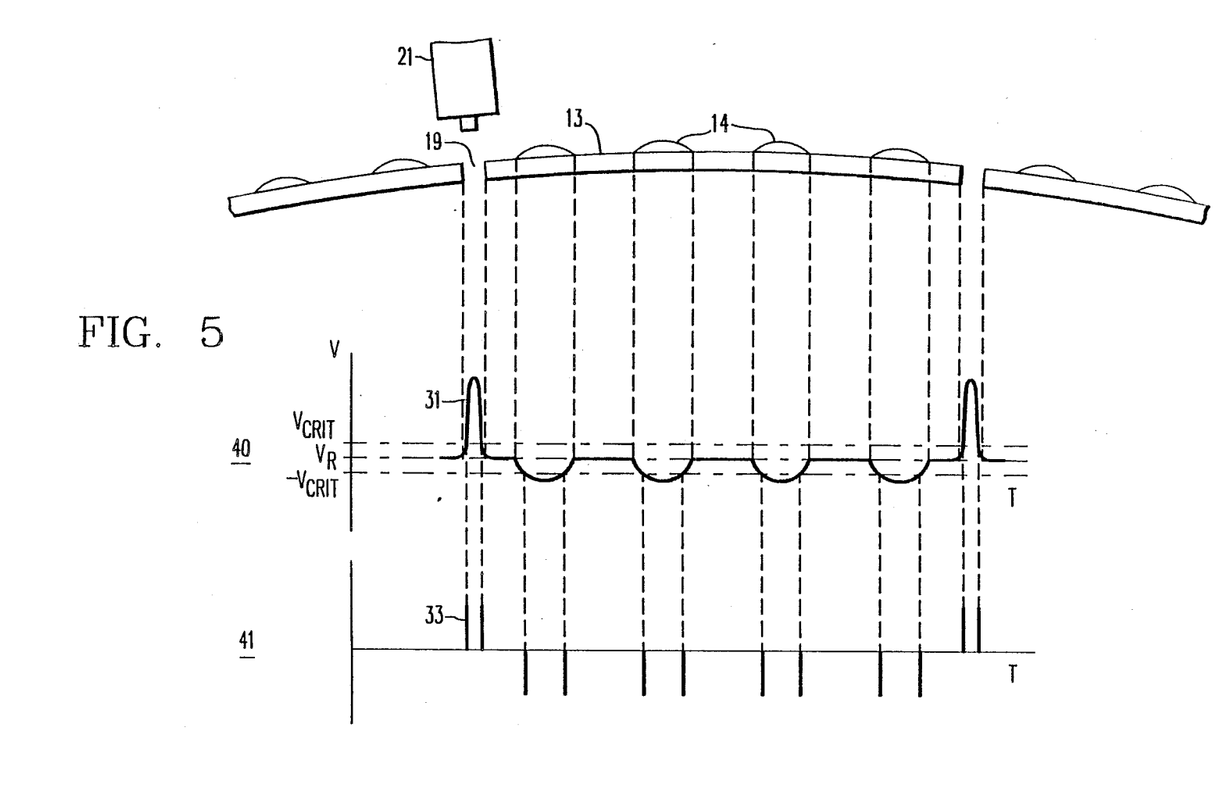
FIG. 5 illustrates sample traces of the sensor output signal and the analog preprocessor output signal.

The sensor output signal 31 can be represented by trace 40 of FIG. 5. Trace 40 illustrates the sensor output signal 31 as a voltage with respect to time and by way of the dashed lines correlates the magnitude of the sensor output signal 31 to the particular surface characteristics of the shroud segment 13 which the sensor 21 is detecting. The detection, by the sensor 21, of the gap 19 between shroud segments 13 causes the sensor output signal 31 to go positive with respect to a reference voltage $V_R$ (the voltage representative of the distance from the surface of the shroud segment 13 to the sensor 21). Similarly, the detection, by the sensor 21, of the tenons 14 causes the sensor signal 31 to go negative with respect to the reference voltage $V_R$.

FIG. 5 also illustrates, in trace 41, the analog output signal 33 of the analog preprocessor 32 of FIG. 4 as a function of time, given the sensor output signal 31 of trace 40. This analog output signal 33 provides a "profile" of the turbine blade shroud segment 13 under dynamic conditions. The analog output signal 33 may be produced by a voltage comparator circuit (not shown) of the analog preprocessor 32 as is generally known in the art. When the sensor output signal 31 voltage goes positive, more than some small value $V_{crit}$ from the reference voltage $V_R$, a positive pulse is generated. A positive pulse also occurs when the voltage returns within the critical voltage $V_{crit}$ of the reference voltage $V_R$. Negative pulses are generated in the same manner when the sensor output signal 31 goes negative.

The analog output signal 33 pulse train or "profile" of trace 41 is input to the analog-to-digital converter 34 of FIG. 4. The resultant digital output signal 35 is then input to the microprocessor 36. The exact time of each pulse relative to the once-per-revolution pulse previously described is stored in microprocessor 36 memory. A normal or expected "profile" of pulse-times is also stored in microprocessor 36 memory.

Figure 6A:
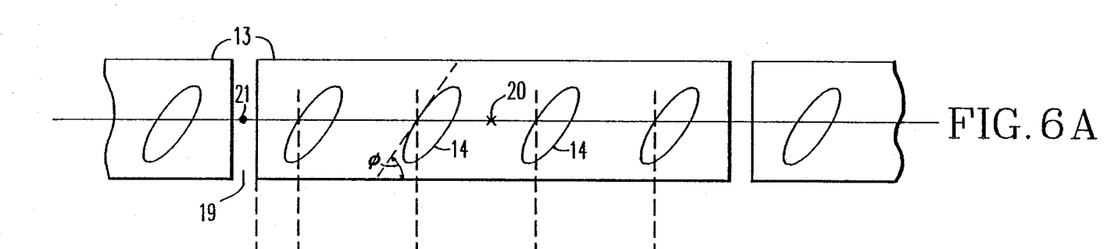
FIGS. 6A, 6B and 6C illustrate the nonvibratory position as well as the extreme positions of vibratory motion of a shroud segment.
Figure 6B:
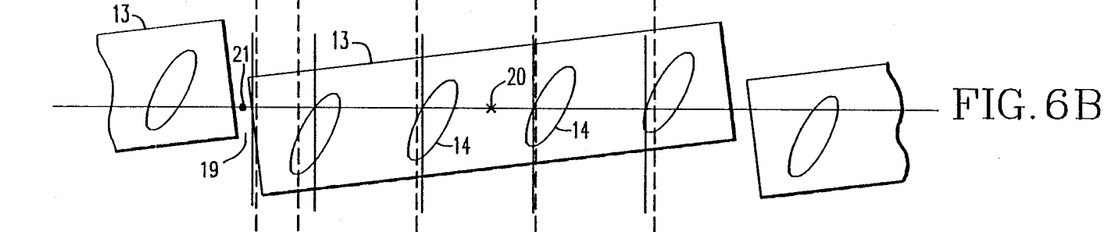
Figure 6C:
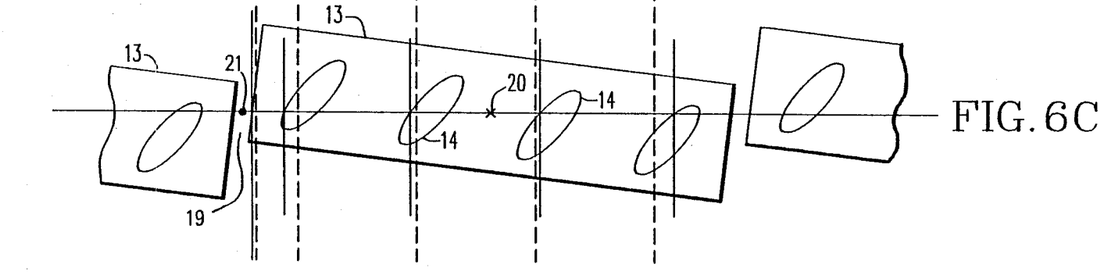

The exact time of each pulse can be used to detect any vibratory motion of the shroud segment 13. FIG. 6A illustrates the normal or nonvibratory position of a shroud segment 13 with respect to a center of rotation 20 of the shroud segment 13 while FIGS. 6B and 6C illustrate the extreme positions of vibratory motion of the shroud segment 13 with respect to the center of rotation 20 of each shroud segment 13. FIGS. 6A, 6B and 6C illustrate how the arrival times of the various shroud surface characteristics (shroud segment gaps 19 and tenons 14) at the sensor 21 varies as the shroud segment 13 oscillates about the center of rotation 20 of the shroud segment 13 due to vibratory motion. The dashed lines represent the normal arrival times whereas the solid lines represent actual arrival times. The sensor 21 will detect the various shroud segment 13 characteristics either earlier than the normal time or later than the normal time depending upon the point in the oscillation about the center of rotation 20 of the shroud segment 13 during which the sensor 21 is positioned above the shroud segment 13.

Figure 7:
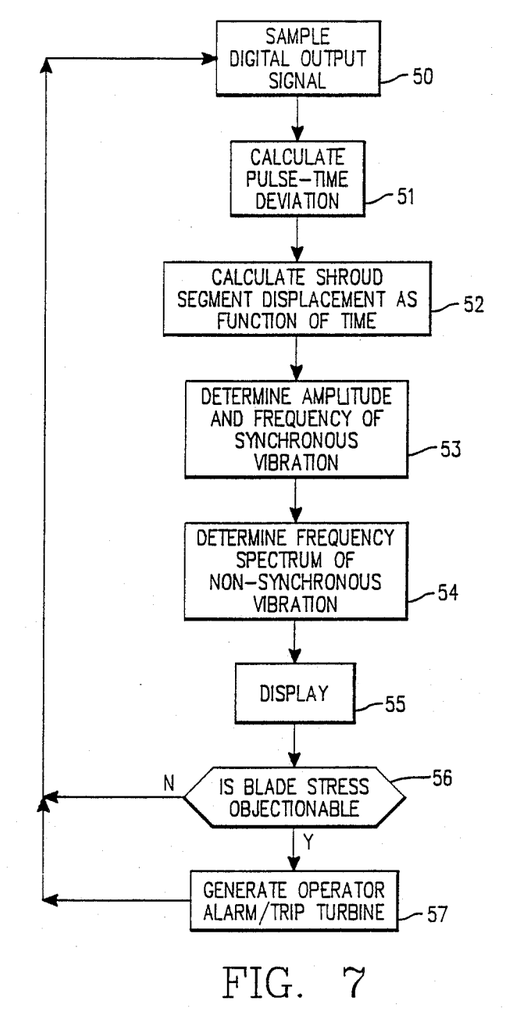
FIG. 7 is a flow chart illustrating the steps performed by the microprocessor of the shrouded turbine blade vibration monitoring system shown in FIG. 4.

The operation of the microprocessor 36 shown in FIG. 4 may be implemented as illustrated in the flow chart of FIG. 7. The flow chart begins at step 50 where the microprocessor 36 samples the digital output signal 35 of FIG. 4. The deviation of the actual time of each pulse (as stored in microprocessor 36 memory) from the normal or nonvibrational time of each pulse (also stored in microprocessor 36 memory) is calculated in step 51. The actual shroud segment 13 displacement corresponding to the time deviation of each individual pulse for that shroud segment 13 is calculated in step 52. The displacement of the shroud segment 13 in a plane parallel to the plane containing the turbine blade row 10 may be calculated by using the following equation:

$$x = v^* \Delta t$$

where
x = shroud segment displacement in a plane parallel to the plane containing the turbine blade row
v = rotational velocity of the shroud segment (mils/μ-sec)
$\Delta t$ = pulse-time deviation (μsec)

The displacement of the shroud segment 13 in a plane perpendicular to the plane containing the turbine blade row 10 may be calculated by using the following equation:

$$y = x \tan \phi$$

where
y = shroud segment displacement in a plane perpendicular to the plane containing the turbine blade row
x = shroud segment displacement in a plane parallel to the plane containing the turbine blade row
$\phi$ = angle between a line tangent to the turbine blade tenon and the edge of the shroud segment as shown in FIG. 6A.

The results of the calculation performed in step 52 provide a plurality of displacement measurements as a function of time for each shroud segment 13, the number of such measurements being a function of the number of surface characteristics (shroud segment gaps 19 and tenons 14) of the shroud segment 13 available for detection by sensor 21.

Program control of the microprocessor 36 continues with step 53 of the flow chart of FIG. 7 where the amplitude and frequency of any synchronous vibration of the shroud segment 13 is determined from the displacement measurements as a function of time calculated in step 52. This determination may be accomplished in any of various manners well known in the art including, but not limited to, curve fitting techniques and pattern recognition systems, the latter of which is especially known in the robotic art.

Figure 8:
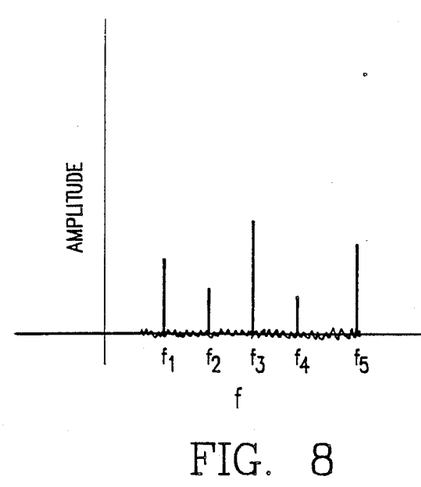
FIG. 8 illustrates a sample frequency spectrum of vibration amplitudes.

The microprocessor 36 then determines the frequency spectrum of any non-synchronous vibration in step 54. The microprocessor 36 can be programmed to operate as a real time analyzer having signal processing means for performing a Fourier analysis on an input signal, the input signal in this case being the shroud segment 13 displacement as a function of time as calculated in step 52. The resulting spectrum of nonsynchronous vibrations, together with the spectrum of synchronous vibrations, is displayed to the operator in step 55 as amplitude of vibration as a function of frequency. An example of such a display is illustrated in FIG. 8.

Program control continues with step 56 of the flow chart of FIG. 7 where the microprocessor 36 determines whether any objectionable stresses are present in the turbine blades 12 as a result of the vibrations determined in steps 53 and 54. This determination is possible because of the relationship which exists between the displacement of the tip of the turbine blade 12 (which is equivalent to the shroud segment 13 displacement or amplitude of vibration monitored by the system 30 of FIG. 4) and the stress which results throughout the turbine blade 12 at any given frequency. If objectionable displacements are detected thus indicating objectionable stresses, the microprocessor 36, in step 57, generates an operator alarm and/or trips the steam turbine in order to prevent physical damage to the turbine which may be caused by a fractured turbine blade 12. If objectionable stresses are not detected in step 56, program control returns to step 50. This entire process is repeated for each shroud segment 13 of each turbine blade row 10.

Although this preferred embodiment of the shrouded turbine blade vibration monitoring system 30 of FIG. 4 has been shown using only one sensor 21 for each turbine blade row 10, more than one sensor 21 may be required in certain applications. The number of sensors 21 provided for each blade row 10 is a function of the lowest frequency of blade 12 vibration of interest in any particular application. This relationship between the number of sensors 21 required and the frequency of vibration of interest is set forth in the following explanation.

If the time of rotation for one complete vibratory oscillation of the shroud segment 13 is long (low frequency vibration), relative to the time for a shroud segment 13 to pass under the sensor 21, there will be only a very small deviation of the shroud segment 13 from its normal position as it passes underneath the sensor 21. It follows that to detect low frequency movement of the shroud segment 13, a very accurate measure of arrival time of any shroud segment 13 surface characteristic at the sensor 21 is needed. Thus, multiple sensors 21 are placed around the circumference of the blade row 10 to insure that all required positions of deviation of the shroud segment 13 from normal are detected. In a typical steam turbine application, the vibrational frequencies of interest range from operating frequency (60 Hz) to the eighth harmonic of operating frequency (480 Hz). Therefore, at least two sensors 21 placed about the periphery of the blade row 10 may be required to detect the low frequency vibrations (60–180 Hz). It becomes apparent that an advantage of this invention over the prior art lies in the fact that a minimal number of sensors 21 is required for each blade row 10.

An additional factor which must be considered in determining the number of sensors 21 required for each turbine blade row 10 is the geometric shape of the tenon 14. A circular shaped tenon 14 requires that the sensor 21 be placed approximately one half of the radius of the tenon 14 from the longitudinal center line of the shroud segment 13 so that vibration in a plane perpendicular to the plane of rotation may be detected as well as vibration within the plane of rotation. The placement of the sensor 21 away from the center line of the shroud segment 13, however, increases the possibility that the shroud segment 13 may be shifted out from beneath the sensor 21 due to differential expansion of the turbine rotor 16. Thus, an additional sensor 21 may be placed adjacent to each of the sensors 21 positioned around the circumference of each blade row 10 when the tenon 14 geometry so dictates.

While the present invention has been described in connection with an exemplary embodiment thereof, it will be understood that many modifications and variations will be readily apparent to those of ordinary skill in the art. This disclosure and the following claims are intended to cover all such modifications and variations.

I claim as my invention:

1. A system for monitoring the vibration of a plurality of turbine blades configured in a row, comprising:
   a sensor for sensing a profile of the turbine blade row under dynamic conditions;
   means for storing an expected profile of the turbine blade row;
   means for comparing said sensed profile to said expected profile to detect displacement of the turbine blades due to vibration;
   means for determining the existence of vibration from said detected displacements; and
   output means responsive to said means for determining.

2. The system of claim 1 wherein the turbine blade row includes a plurality of turbine blade shroud segments carried on the ends of the turbine blades and a plurality of tenons which secure the turbine blade shroud segments to the turbine blades and wherein said sensor senses the presence of the turbine blade shroud segments and the turbine blade tenons.

3. The system of claim 2 additionally comprising a plurality of stationary sensors placed substantially outside of a steam flow path through the turbine blades, and wherein the number of said sensors is a function of the lowest frequency of turbine blade motion to be detected.

4. The system of claim 3 wherein said sensors are placed adjacent to each other in pairs circumferentially about the turbine blade row.

5. The system of claim 2 wherein said means for comparing includes a microprocessor and analog preprocessing circuitry.

6. The system of claim 5 wherein said means for comparing detects displacement of the turbine blade shroud segments within a plane containing the turbine blade row.

7. The system of claim 6 wherein said displacement of the turbine blade shroud segments is detected by comparing a time of arrival of each turbine blade tenon at said sensor to an expected time of arrival at said sensor.

8. The system of claim 7 wherein said means for comparing detects displacement of the turbine blade shroud segments perpendicular to said plane containing the turbine blade row.

9. The system of claim 8 wherein said displacement of the turbine blade shroud segments perpendicular to said plane containing the turbine blade row is derive trigonometrically from said displacement of the turbine blade shroud segments within said plane containing the turbine blade row.

10. The system of claim 9 wherein said means for determining determines an amplitude and frequency of the vibration.

11. The system of claim 2 additionally comprising means for generating an operator alarm in response to said determined amplitude and frequency.

12. The system of claim 2 additionally comprising means for tripping the turbine in response to said determined amplitude and frequency.

13. A steam turbine having a blade vibration monitoring system, comprising:
   a shaft carrying rows of high pressure turbine blades, intermediate pressure turbine blades, and shrouded low pressure turbine blades;
   a pair of stationary seals surrounding each of said turbine blade rows to reduce the amount of steam that passes around said turbine blades;
   a stationary sensor positioned between each pair of seals for sensing a profile of each shrouded, low pressure, turbine blade row under dynamic conditions;
   means for storing an expected profile of each shrouded, low pressure, turbine blade row;
   means for comparing said sensed profiles to said expected profiles to detect displacement of said shrouded turbine blades due to vibration;
   means for determining the existence of vibration from said detected displacements; and
   output means responsive to said means for determining.

14. A method for monitoring the vibration of a plurality of turbine blades configured in a row, comprising the steps of:
   sensing a profile of the turbine blade row under dynamic conditions with a single sensor;
   storing an expected profile of the turbine blade row;
   comparing said sensed profile to said expected profile to detect displacement of the turbine blades due to vibration;
   determining the existence of vibration from said detected displacements; and
   generating an output in response to said vibration.

15. The method of claim 14 wherein the turbine blade row includes a plurality of turbine blade shroud segments carried on the ends of the turbine blades and a plurality of tenons which secure the turbine blade shroud segments to the turbine blades and wherein said step of sensing said profile includes the step of sensing the presence of the turbine blade shroud segments and the turbine blade tenons.

16. The method of claim 15 wherein the step of comparing includes the step of detecting displacement of the turbine blade shroud segments within a plane containing the turbine blade row.

17. The method of claim 16 wherein the step of comparing includes the step of detecting displacement of the turbine blade shroud segments perpendicular to said plane containing the turbine blade row.

18. The method of claim 17 wherein the step of determining includes the step of determining an amplitude and frequency of the vibration.

19. The method of claim 15 additionally comprising the step of generating an operator alarm in response to vibration.

20. The method of claim 15 comprising the step of tripping the turbine in response to vibration.

* * * * *